(12) United States Patent
Timonov et al.

(10) Patent No.: US 7,382,603 B2
(45) Date of Patent: Jun. 3, 2008

(54) ELECTRODE FOR ENERGY STORAGE DEVICES AND ELECTROCHEMICAL SUPERCAPACITOR BASED ON SAID ELECTRODE

(75) Inventors: Alexander Timonov, St. Petersburg (RU); Sergey Logvinov, St. Petersburg (RU); Dmitry Pivunov, St. Petersburg (RU)

(73) Assignee: Gen 3 Partners, Inc., Boston, MA (US)

( * ) Notice: Subject to any disclaimer, the term of this patent is extended or adjusted under 35 U.S.C. 154(b) by 203 days.

(21) Appl. No.: 11/401,173

(22) Filed: Apr. 10, 2006

(65) Prior Publication Data
US 2007/0065719 A1    Mar. 22, 2007

Related U.S. Application Data

(63) Continuation of application No. PCT/IB2004/052091, filed on Oct. 14, 2004.

(60) Provisional application No. 60/510,838, filed on Oct. 14, 2003.

(51) Int. Cl.
*H01G 9/00* (2006.01)
(52) U.S. Cl. ...................... 361/503; 361/502
(58) Field of Classification Search ................ 361/502, 361/503; 429/213; 252/62.2
See application file for complete search history.

(56) References Cited
U.S. PATENT DOCUMENTS
4,999,263 A    3/1991 Kabata et al.
(Continued)

FOREIGN PATENT DOCUMENTS
WO    WO 03/065536 A    8/2003

OTHER PUBLICATIONS

Reddinger, et al., "Tunable Redox and Optical Properties Using Transition Metal-Complexed Polythiophenes," 1997, pp. 673-675, American Chemical Society, Macromolcules V. 30.

(Continued)

*Primary Examiner*—Eric Thomas
(74) *Attorney, Agent, or Firm*—Kirkpatrick & Lockhart Preston Gates Ellis LLP

(57) ABSTRACT

An electrode comprises an electrically conductive substrate, a layer of energy accumulating redox polymer deposited onto the substrate, the redox polymer comprising a polymer metal complex with a substituted tetra-dentate Schiff's base selected from the group: poly-[Me(R, R'-Schiff-Y)], wherein Me is a transition metal; Y is a bridge group binding the atoms of Nitrogen in the Schiff's base; R is an electron-donating substituent comprising a functional group (X)O—, —COO(X), where (X) is an alkali metal; R' is Hydrogen or Halogen; and wherein the polymer metal complex has the following structure:

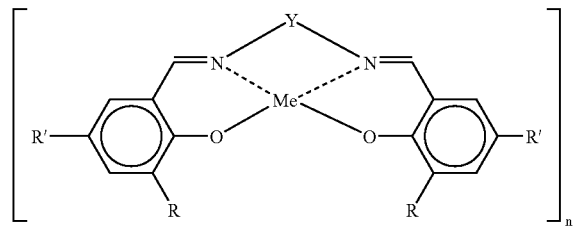

The electrochemical capacitor comprises a case housing the above-described positive electrode and a negative electrode disposed inside the case, and an electrolyte filling the space between the electrodes.

36 Claims, 3 Drawing Sheets

U.S. PATENT DOCUMENTS

| | | | |
|---|---|---|---|
| 5,543,326 | A | 8/1996 | Heller et al. |
| 5,620,812 | A | 4/1997 | Tahara et al. |
| 5,729,427 | A | 3/1998 | Li et al. |
| 5,840,443 | A | 11/1998 | Gregg et al. |
| 6,323,309 | B1 | 11/2001 | Swager et al. |
| 6,413,676 | B1 | 7/2002 | Munshi et al. |
| 6,533,918 | B2 | 3/2003 | Roitman et al. |
| 6,777,134 | B2 | 8/2004 | Mori et al. |
| 6,795,293 | B2 * | 9/2004 | Timonov et al. ............ 361/303 |
| 7,292,431 | B2 | 11/2007 | Timonov et al. |
| 2002/0089807 | A1 | 7/2002 | Bluvstein et al. |
| 2004/0057191 | A1 * | 3/2004 | Timonov et al. ............ 361/302 |
| 2005/0217998 | A1 | 10/2005 | Timonov et al. |
| 2005/0258042 | A1 | 11/2005 | Lyubomirskiy et al. |

OTHER PUBLICATIONS

Reddinger, et al., "Site Specific Electropolymerization to Form Transition-Metal-Containing, Electroactive Polythiophenes," 1998, pp. 1236-1243, American Chemical Society, Chem. Mater. V. 10.

Reddinger, et al., "A Novel Polymeric Metallomacrocycle Sensor Capable of Dual-Ion Cocomplexation," 1998, pp. 3-5, Communications, American Chemical Society, Chem. Mater. V. 10.

Ordaz, et al., "Electrocatalysis of the reduction of organic halide derivatives at modified electrodes coated by cobalt and iron macrocyclic complex-based films: application to the electrochemical determination of pollutants,"2000, pp. 238-244, EDP Sciences.

Liu, et al., "Electro-catalytic oxidation of ascorbic acid at a cobalt-salen polymer modified electrode and analytical applications," 2000, pp. 175-192, Analytical Letters 33(2).

Cassidy, et al., Oxidation-Reduction Polymers, Chapter 1: Overall View of the Field of Oxidation-Reduction Polymers, 1965, pp. 1-11, Interscience Publishers.

Hoferkamp, "Surface-Modified Electrodes Based on Nickel (II) and Copper (III) Bis(salicylaldimine) Complexes," 1989, pp. 348-352, Chemistry of Materials V. 1, American Chemical Society.

Bedioui, et al., "Electrooxidative polymerization of cobalt, nickel and manganese salen complexes in acetonitrile solution," 1991, pp. 267-274, J. Electroanal. Chem. V. 301.

Audebert, et al., Redox and Conducting Polymers Based on Salen-Type Metal Units; Electrochemical Study and Some Characteristics, 1992, pp. 697-703, New Journal of Chemistry V. 16.

Horwitz, et al., "Oxidative Electropolymerization of Metal Schiff-Base Complexes," 1988, pp. 389-404, Mol. Cryst. Liq. Cryst. V. 160.

Martins, et al., "Ni(Salen)-based Polymer Modified Electrodes as Sensors for Metal Ions," pp. 399-407, Electrochemical Society Proceedings V. 2001 -18.

Hurrell, et al., Redox Conduction in Electropolymerized Films of Transition-Metal Complexes of Os, Ru, Fe and Co, 1990, pp. 736-741, American Chemical Society, Inorg. Chem. V. 29.

Timonov, Shagisultanova, "Synthesis and Properties of New Polymeric Partially Oxidized Complexes of Platinum and Palladium with Schiff Bases," 1991, p. 28, Departimento di Chimica, Ferrara (Italy), Workshop on Platinum Chemistry: Fundamental And Applied Aspects.

Audebert, et al. "Electrochemical Polymerization of Several Salen-type complexes. Kinetic Studies in the Microsecond time range," 1992, pp. 269-278, J. Electroanalysis Chem. 338.

Lewis, "A Simple General Model for Charge Transfer in Polymers," 1989, pp. 189-201, Faraday Discuss. Chem. Soc. V. 88.

Lanquin Mao, et al., "A New Ultramicrosensor for Nitric Oxide Based On Electropolymerized Film of Nickel Salen," 1998, pp. 1991-2007, Analytical Letters 31(12).

Conway, "Electrochemical Supercapacitors," 1999, Chap. 12, Kluwer Acad. Publ.

Timonov, Shagisultanova, "Synthesis and Properties of Polymeric Partially-Oxidized Complexes of Nickel, Palladium and Platinum with Tetradentate Schiff Bases," 1991, pp. 286-293, Plenum Publishing Corp.

Mao, et al., "Electrochemical Nitric Oxide Sensors Based on Electropolymerized Film of M(salen) with Central Ions of Fe, Co, Cu and Mn," 1999, pp. 72-77, Electroanalysis 2000 V. 12, No. 1.

International Search Report dated Dec. 29, 2004 for International Application No. PCT/IB2004/052091.

Written Opinion of the International Searching Authority dated Dec. 29, 2004 for International Application No. PCT/IB2004/052091.

* cited by examiner

ELECTRODE FOR ENERGY STORAGE DEVICES AND ELECTROCHEMICAL SUPERCAPACITOR BASED ON SAID ELECTRODE

This application is a continuation of PCT application serial number PCT/IB2004/52091 filed on Oct. 14, 2004, which claims benefit of a provisional application Ser. No. 60/510,838 filed on Oct. 14, 2003, both of which are incorporated herein by reference in their entirety.

FIELD OF THE INVENTION

The invention claimed herein relates to electrical engineering, and more specifically, to electrodes and electrode-based energy storage devices and may be used for the creation of electrochemical energy storage devices or secondary sources of current, such as supercapacitors.

BACKGROUND OF THE INVENTION

Secondary sources of current make it possible to accumulate, store and release electric power to an external electric circuit. Among these secondary sources are conventional batteries, conventional capacitors and electrochemical capacitors (also called Supercapacitors or Ultracapacitors).

An electrochemical supercapacitor usually comprises a hermetically sealed housing filled with an electrolyte, a positive electrode (cathode) and a negative electrode (anode) placed inside the housing, a separator, such as a membrane that separates the anode space from the cathode space and special lead terminals coupling the supercapacitor to external electric circuits.

Electrochemical supercapacitors are based on the capacitive (not battery type) or Faradic (battery type) method for storing electrical power. In the first case the capacity of the double electrical layer formed at the electrolyte/electrode boundary is used for energy storage. Typically carbon materials having a large specific surface are used in capacitive devices as electrodes. During the charge/discharge process in a capacitive device no chemical or phase changes take place on the electrode surface or inside the electrode.

In the devices of the second type the charge/discharge process is accompanied by redox reactions on the surfaces of the electrodes. In contrast to batteries, these processes take place inside a thin layer of an electrochemically active compound on the surface of the electrodes. In the most well known supercapacitors of this type the surface of the electrodes is covered with metal oxides Typically both methods of energy accumulation are implemented in real devices, however, it is always possible to tell which method makes the main contribution to the energy accumulation process and to classify the capacitor by the energy storing method.

Electrochemical supercapacitors exhibit a very high specific power up to as high as 10 kW/kg and a long service life of up to 1 million charge/discharge cycles. These characteristics provide for a wide range of potential applications for such electrochemical supercapacitors.

Nevertheless, known electrochemical supercapacitors have disadvantages, of which the most important is their low specific energy capacity. The value of the specific energy capacity of commercially available products is within the range of 1-10 W·h/kg.

The maximal values of the specific energy capacity of about 30 W·h/kg were claimed for the electrochemical supercapacitors of the Faradic type comprising carbon electrodes with ruthenium oxide on their surface. However, the high cost of ruthenium hinders the wide application of such devices.

The above-described disadvantages are based on objective factors. The maximal values of the specific energy capacity of the known supercapacitors are limited primarily by the nature of the metal oxides—the materials used in electrode manufacture, which also contributes to the high cost of these devices.

In an international application "Polymer-modified electrode for energy storage devices and electrochemical supercapacitor based on said polymer-modified electrode", WO03065536A2, a chemically modified electrode comprises a conducting substrate and a layer of an energy-accumulating redox polymer deposited onto the layer. The redox polymer is a stack-type polymer complex compound of a transition metal having at least two different degrees of oxidation. The redox polymer also comprises monomer fragments of a planar structure with a branched system of conjugated π-bonds and the deviation from the plane of no greater than 0.1 nm.

A polymer metal complex with a substituted tetra-dentate Schiff's base may be used as the polymer complex compound of a transition metal—for example, the compound from the group: poly-[Me(R, R'-Salen)], where: Me—transition metal;
  Salen—residue of bis-(salicylaldehyde)-ethylenediamine in Schiff's base;
  R—H or electron-donating substituent, for example, $CH_3O$—, $C_2H_5O$—, HO— or —$CH_3$;
  R'—H or Hlg,
may be used as said polymer metal complex.

Energy-accumulating devices with electrodes comprising redox polymers can possess the properties of different types of supercapacitors and of electrochemical batteries, i.e. a high specific power and high specific energy capacity, respectively. The main distinguishing feature of the known electrochemical capacitor is the design of its electrodes—at least one of them is made as a chemically modified electrode.

It should be noted that the examples given in the international application WO03065536A2 don't exhaust the possible ways of using the polymer metal complexes with substituted tetra-dentate Schiff's base.

SUMMARY OF THE INVENTION

The present invention provides an electrode with a high specific energy capacity by using new polymer metal complexes with a substituted tetra-dentate Schiff's base, as well as provides an electrochemical capacitor based on this electrode.

The electrode for energy storage devices comprises a conducting substrate with a deposited layer of an energy-accumulating redox polymer being a polymer metal complex with a substituted tetra-dentate Schiff's base from the group: poly-[Me(R, R'-Schiff-Y)], where: Me—transition metal;
  Y—a bridge group binding the atoms of nitrogen in the Schiff's base;

R—an electron-donating substituent which is a functional group (X)O—, —COO(X), where (X) is an alkali metal, for example, Li or Na;

R'—H or Hlg;

The polymer metal complex has the following structure:

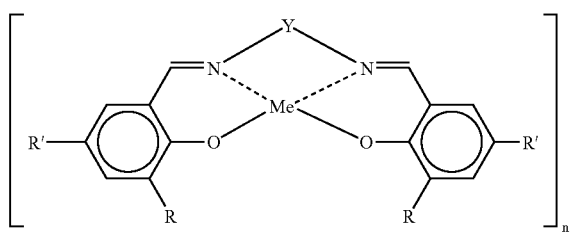

where n may take any value within the range from 2 to 50000.

The novel electrode differs from the one described in application WO03065536 in that an alkali metal —(X), for example Li or Na, is used in the functional group (X)O—, —COO(X) of the electron-donating substituent R. Use of an alkali metal allows increasing the specific energy capacity of the energy storage device.

Salen, which is a residue of bis(salicylaldehyde)-ethylenediamine, can be used as a group -Schiff-Y. In this case the compound has the following structure:

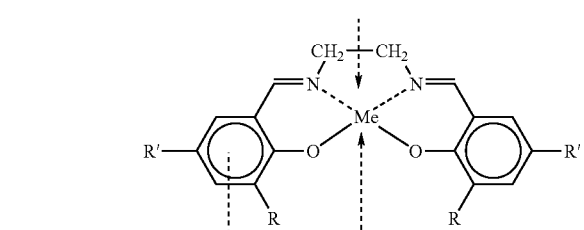

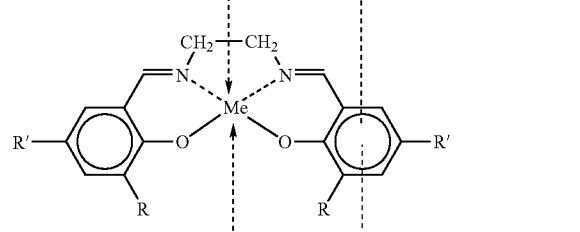

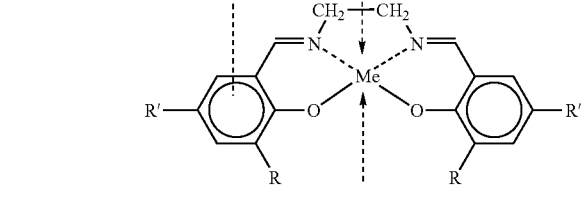

Saltmen, which is a residue of bis(salicylaldehyde)-tetramethylethylenediamine, can be used as a group—Schiff-Y. In this case the compound has the following structure:

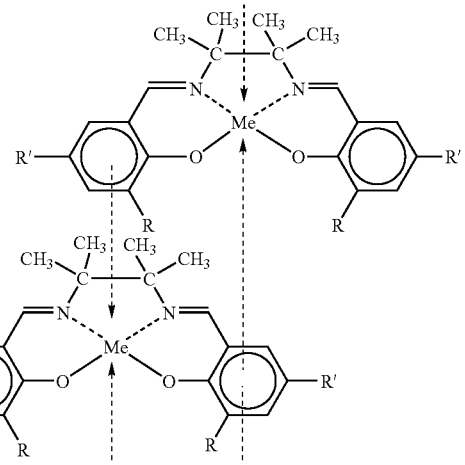

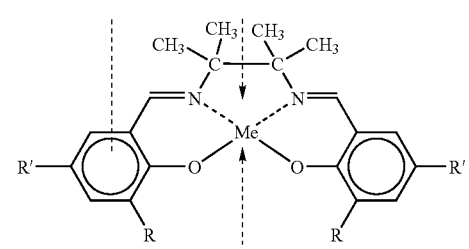

Salphen, which is a residue of bis-(salicylaldehyde)-o-phenylenediamine can be used as a group—Schiff-Y. In this case the compound has the following structure:

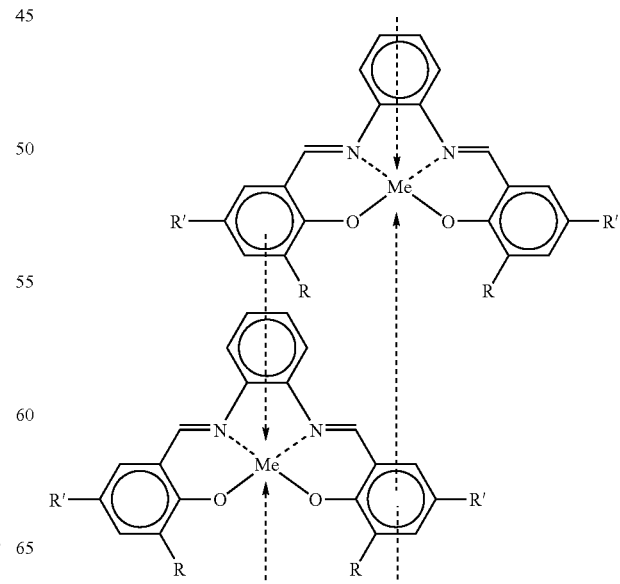

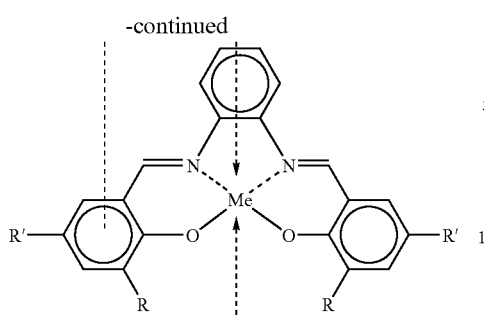

A metal selected from the group consisting of Ni, Pd, Co, Cu, and Fe can be used as a transition metal in a polymer complex compound.

A structure having large specific surface made of a material which is electronically conductive and electrochemically inactive within the range of potentials from −3.0 V to 1.5 V can be used as a conducting substrate (hereinafter the potentials are given relative to the silver/silver chloride reference electrode). For example, carbon fiber and other carbon materials with large specific surface, carbon materials with metal coating, or metal electrodes with complex-relief surface can be used. Besides, polymers with electronic conduction in the form of films, porous structures, foams, etc. may be used as a conductive substrate material.

The types of polymer metal complexes used in the above-described electrode belong to the class of redox polymers which have a directed electronic redox-conduction. The formation of the bonds between the fragments can be considered from the viewpoint of the donor-acceptor intermolecular interaction between a ligand of one molecule and a metal center of another molecule. As a result, the formation of the so-called "monomer" or "stack" macromolecules takes place. It is noted that the formation of the "stack" structures of the polymer, as it has also been discovered by the inventors, is possible only through the use of monomers having a square-planar spatial structure. Schematically this formation process may be depicted in the following way:

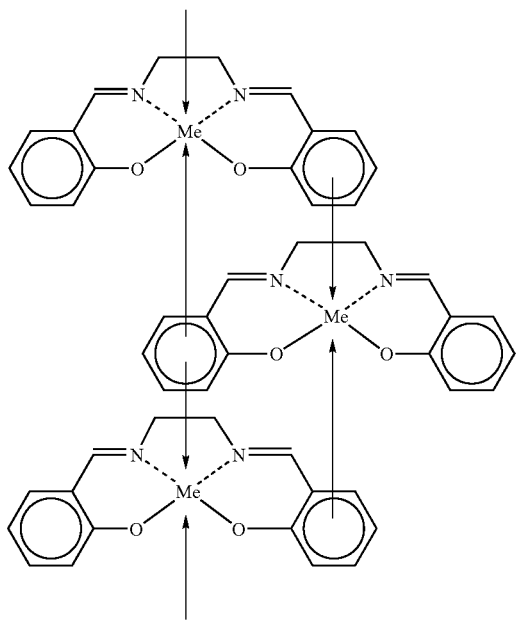

From the outside an aggregation of these macromolecules looks like a solid transparent film on the surface of the electrode, the film having a different color depending upon the nature of the metal and the presence of substituents in the structure of the ligand.

Polymer metal complexes are bound to the surface of the inert electrode as a result of chemosorption.

The charge transfer in polymer metal complexes happens due to "electron hopping" between the metal centers with different charge states and can be described in terms of a diffusion model. Oxidation or reducton of polymer metal complexes associated with the change of the charge state of the metal centers and with the directed charge transfer over the polymer chain is accompanied by the penetration of the charge-compensating counter-ions into the polymer or by their exiting from the polymer. The charge-compensating counter-ions are located in the electrolyte solution surrounding the polymer.

The above-described electrode can be employed as a positive electrode of the electrochemical capacitor.

The electrochemical capacitor comprises a case, housing a positive and negative electrodes disposed inside the case and an electrolyte that fills the space between the electrodes.

The negative electrode can be made by different methods.

In one of the embodiments of the invention, the negative electrode comprises an active material containing the same alkali metal contained in the composition of the electron-donating substituent of the energy-accumulating redox polymer of the positive electrode.

The electrode material is able to "absorb" the active the metal, which is used in the composition of the functional group (the radical) R of the positive electrode, from the electrolyte in order to retain in its structure and to release, described above.

Thus, for example, if the group LiO— or —COOLi is used as R in the redox polymer, then graphite or any other material used as a negative electrode material in the commercially accessible lithium ion batteries can be used as a material of the negative electrode. In this case lithium will be used as the active material. In case when the group NaO— or —COONa is used as R of the redox polymer, then any material capable of retaining sodium in its structure and releasing sodium (i.e. capable of reversible intercalation) can be used as an active material of the negative electrode.

In another embodiment, the negative electrode is made as a conducting substrate, onto which a layer of energy-accumulating redox polymer is deposited, with said redox polymer being a polymer metal complex with substituted tetra-dentate Schiff's base from the group: poly-[Me(R, R'-Schiff-Y)], where: Me—transition metal;

Y—the bridge group binding the atoms of nitrogen in the Schiff's base;

R—electron-donating substituent in the form of a functional group (X)O—, —COO(X), where (X)—an alkali metal contained in the composition of the electron-donating substituent of the energy-accumulation redox polymer of the positive electrode;

R'—H or Hlg, at that, the compound has the following structure:

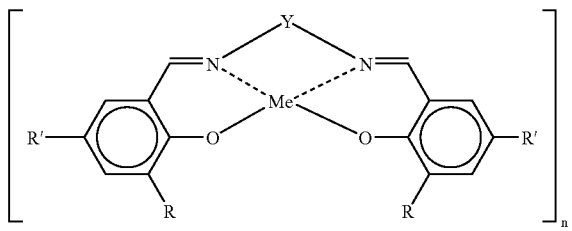

where n can be any value in the range from 2 to 50000.

Salen—residue of bis(salicylaldehyde)-ethylenediamine, or Saltmen—residue of bis(salicylaldehyde)-tetramethylethylenediamine or Salphen—residue of bis(salicylaldehyde)-o-phenylenediamine can be used as -Schiff-Y.

The negative electrode can also be made as a conducting substrate, onto which a layer of energy-accumulating redox polymer is deposited, with said redox polymer being a polymer metal complex with a substituted tetra-dentate Schiff's base, from the group: poly-[Me(R, R'-Schiff-Y)], where: Me—transition metal;

Y—a bridge group binding the atoms of nitrogen in the Schiff's base;

R—electron-donating substituent in the form of a functional group H, $CH_3O$—, $C_2H_5O$—, HO—, —$CH_3$;

R'—H or Hlg, at that, the structure of this compound is as follows:

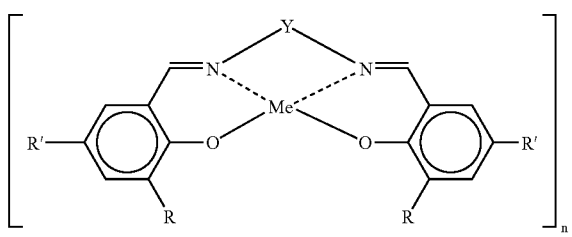

where n can take any value within the range of 2 to 50000.

Salen—residue of bis(salicylaldehyde)-ethylenediamine, or Saltmen—residue of bis(salicylaldehyde)-tetramethylethylenediamine, or Salphen—residue of bis(salicylaldehyde)-o-phenylenediamene may be used as a group—Schiff-Y.

The electrolyte is a solution of a compound (in an organic solvent), which is soluble in the said solvent to a concentration of no less than 0.01 mol/l and which contains the electrochemically inactive (within the range of potentials from −3.0 to +1.5 V) ions—i.e. anions as well as cations of an alkali metal in its composition. The alkali metal is a component of the electron-donating substituent of the energy-accumulating redox polymer of the positive electrode. Salts of the used metal (for example, the salts of lithium—perchlorates, tetrafluoroborates, hexafluorophosphates and other compounds meeting the above requirements) are the examples of such compounds.

A solvent is selected from the group consisting of acetonitrile, dimethyl ketone, and propylene carbonate can be used as the organic solvent.

Besides, the electrolyte composition can contain additional compounds—stabilizers extending the service life and enhancing the reliability and stability of properties and other parameters. Thickeners that transform the electrolyte into a gel-like state can be used to improve service properties. A gel electrolyte enables one to lower the sturdiness requirements of the case and therefore to create compact energy-storage devices of various shapes.

A separator dividing the internal space of the capacitor into a cathode and anode space can be disposed between the electrodes in order to prevent any the short circuit between the electrodes.

The case of the capacitor is made of a material resistant to the action of the electrolyte. Auxiliary components (e.g. a device for pouring an electrolyte, safety valves and fastening elements) are mounted on the case of the capacitor.

BRIEF DESCRIPTION OF THE DRAWINGS

The invention is illustrated with the following graphic materials.

DETAILED DESCRIPTION OF THE INVENTION

Figure 1:
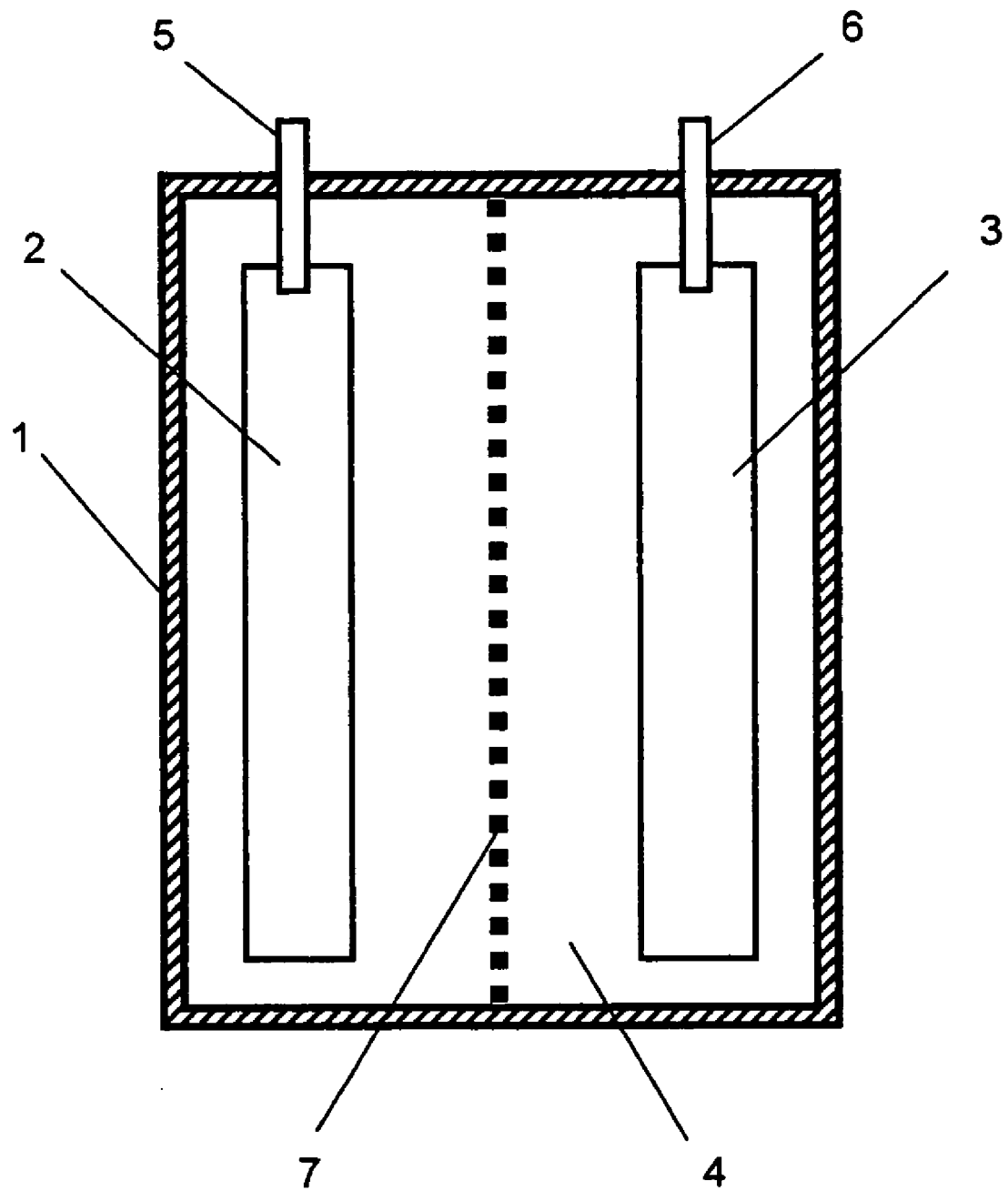
FIG. 1 presents a schematic diagram of the electrochemical supercapacitor.

The capacitor consists of a case 1, electrodes—2 and 3, an electrolyte 4, lead terminals—5 and 6, a separator 7, as illustrated in FIG. 1.

Let us consider the operation of the invention claimed herein based on an example of the electrochemical energy-storage device as shown in FIG. 2, in which the function of a positive electrode is performed by an electrode 11. Any of said redox polymers 13 having group LiO— or —COOLi as R can be deposited onto a conducting substrate 12, while the function of a negative electrode is performed by a lithium electrode 14 in which metal lithium 16 is implanted in a carbon base 15. The device is filled with an electrolyte containing one of the above-described lithium salts as a compound used for the creation of ionic conductivity of the electrolyte. The salt of the electrolyte is schematically shown in the form of lithium cations 17 and anions 18.

Figure 2A:
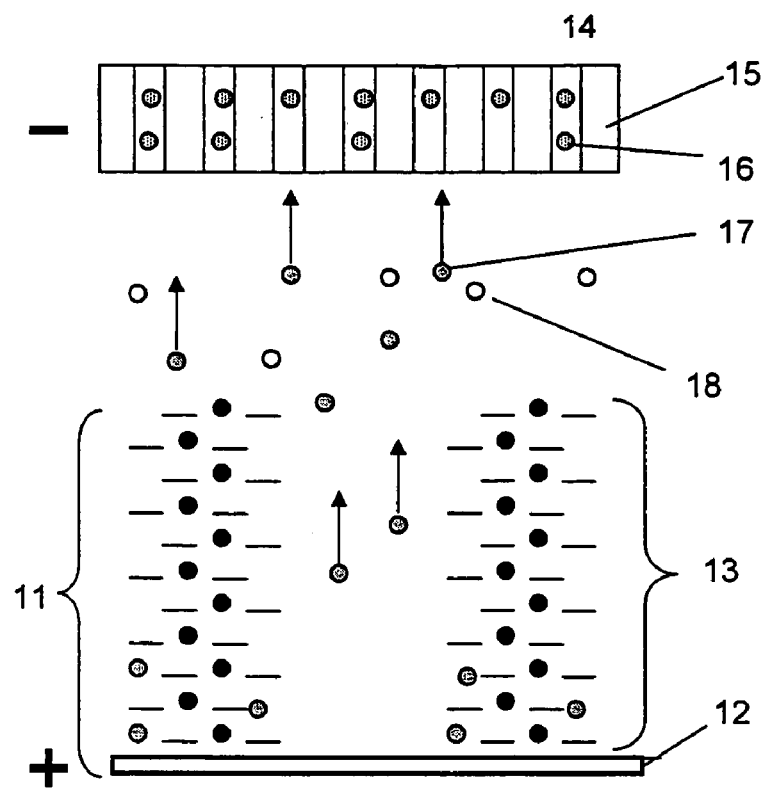
FIG. 2 illustrates a process of charging and discharging of the electrochemical supercapacitor.
Figure 2B:
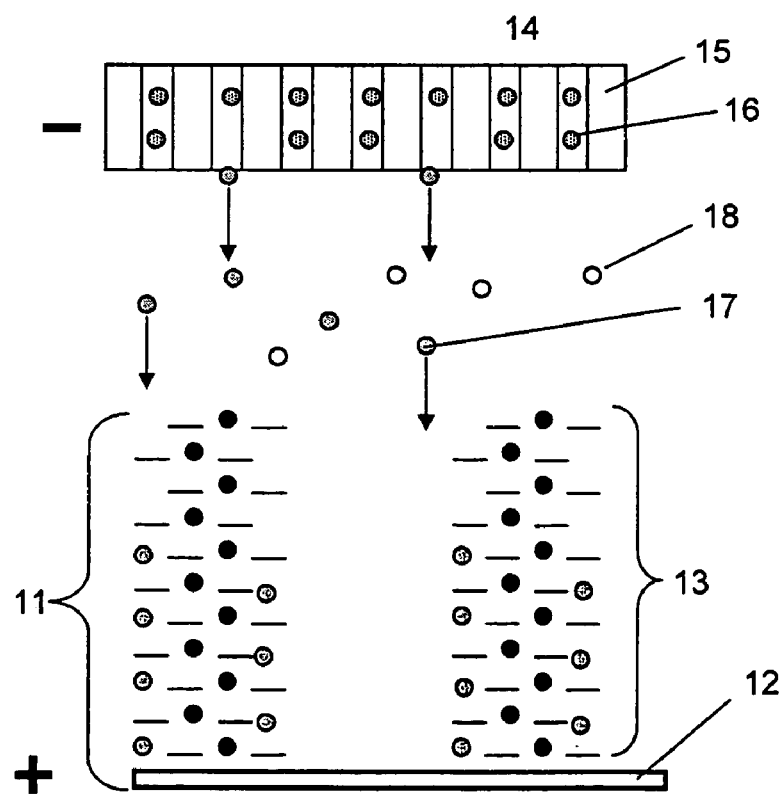

During the charging of the device (as shown in FIG. 2a) positive and negative potentials are supplied to positive electrode 11 and negative electrode 14, respectively. The range of positive potentials may be from 0.85 V to 1.3 V, the range of negative potentials may be from −2.7 V to −3.5 V. Under such conditions redox polymer 13 on positive electrode 11 transitions to the oxidized state, the ions of lithium 17 separate from the molecules of redox polymer 13 being oxidized, thus compensating for the change of its charge, diffuse to negative electrode 14 and are reduced from the electrolyte in the volume of graphite 15 on negative electrode 14.

During the discharging process of the device (see FIG. 2b) redox polymer 13 is reduced on positive electrode 11, metallic lithium 16 is oxidized on negative electrode 14, the ions of lithium 17 return to the electrolyte, diffuse to positive electrode 11 and are aggregated with the molecules of redox polymer 13, thus compensating for the change of its charge.

Figure 3A:
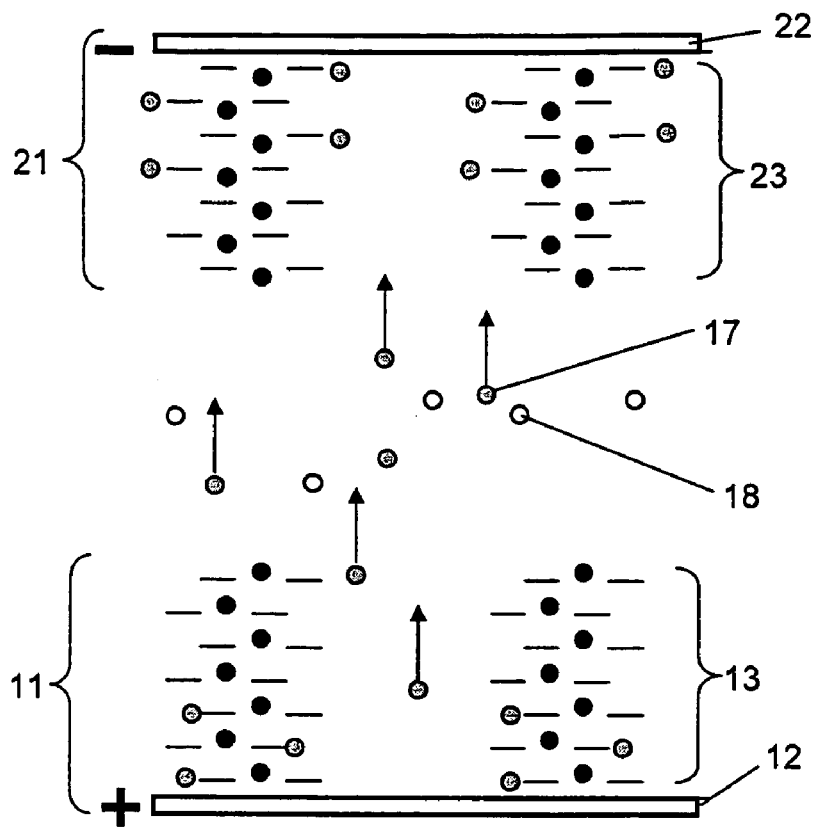
FIG. 3 illustrates another process of charging and discharging of the electrochemical supercapacitor.
Figure 3B:
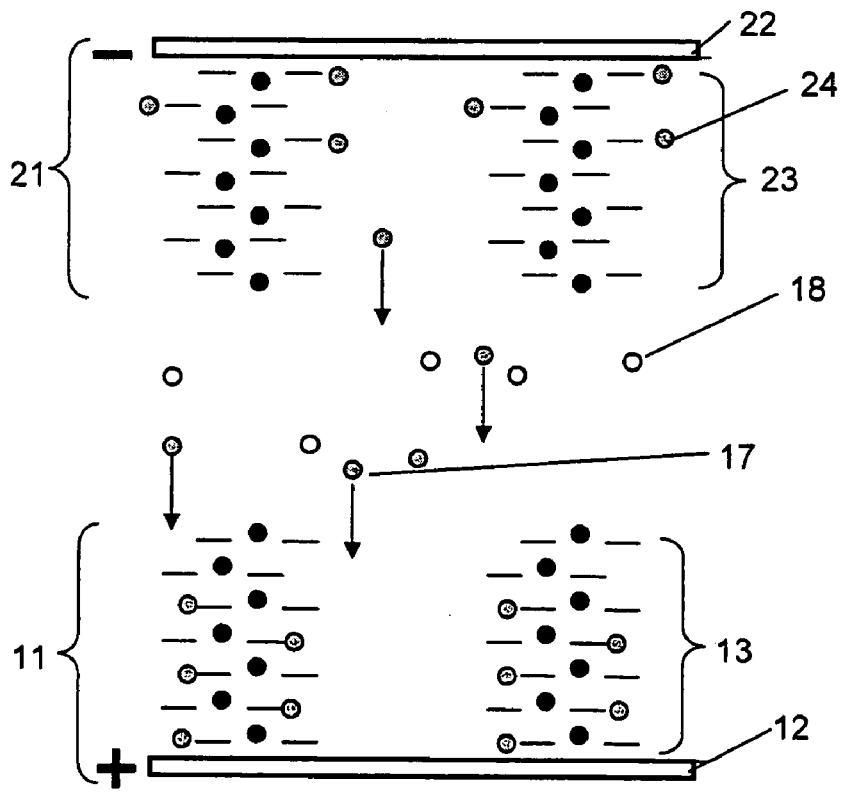

Let us consider another example (shown FIG. 3), when the function of a positive electrode is performed by electrode 11, which is chemically modified by any of the above-described redox polymers, which have the group LiO— or —COOLi as R, while the function of a negative electrode is performed by an electrode 21, which is chemically modified by any of the redox polymers and which has the same transition metal as the redox polymer on positive electrode 11. The transfer of the ions of lithium 17 in the process of charging (see FIG. 3a) and of discharging (see FIG. 3b) will take place in accordance with the mechanism described above. The difference is in that if previously (see FIG. 2a) in the process of charging the ions of lithium 17 were reduced in the structure of graphite 15 to metallic lithium 16, now the redox polymer 23 is reduced on electrode 21 in the process of charging, while the lithium ions 24 are retained near the molecules of polymer 23 in the inter-stack space by the electrostatic forces (they are not chemically aggregated with the ligand molecules as they do on positive electrode 11) compensating for the variation of the charge of the redox polymer.

The design of the electrochemical energy-storage device described in the example with a graphite (lithium) negative electrode is advantageously different from the known lithium-ion batteries, because it has a higher energy capacity, which is achieved due to the higher potentials of the positive electrode (1.1 V-1.3 V as compared to 0.4 V-0.6 V) and a higher power. The latter is achieved due to the fact that the redox polymer may be reduction in the course of discharging at a rate which is many times higher than the rate of reduction of the positive electrode of lithium-ion batteries. This device also has a lower cost, since the electrode based on a less expensive redox polymer is employed instead of the expensive electrode based on the oxides of metals.

What is claimed is:

1. An electrode comprising an electrically conductive substrate, a layer of energy accumulating redox polymer deposited onto the substrate, the redox polymer comprising a polymer metal complex with a substituted tetra-dentate Schiff's base selected from the group: poly-[Me(R, R'-Schiff-Y)], wherein Me is a transition metal;
Y is a bridge group binding the atoms of Nitrogen in the Schiff base;
R is an electron-donating substituent comprising a functional group (X)O—, —COO(X), where (X) is an alkali metal selected from the group consisting of Li and Na;
R' is Hydrogen or Halogen; and wherein
the polymer metal complex has the following structure:

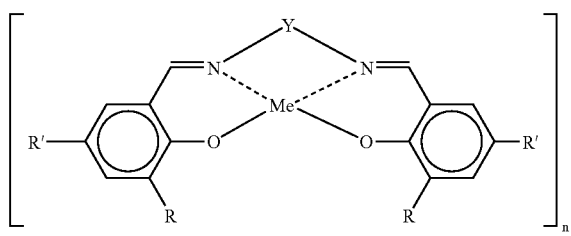

with n selected from the range from 2 to 50000.

2. The electrode according to claim 1, wherein the group Schiff-Y comprises Salen, which is a residue of bis(salicylaldehyde)-ethylenediamine.

3. The electrode according to claim 1, wherein the group Schiff-Y is Saltmen, which is a residue of bis(salicylaldehyde)-tetramethylethylenediamine.

4. The electrode according to claim 1, wherein the group Schiff-Y is Salphen, which is a residue of bis(salicylaldehyde)- o-phenylenediamine.

5. The electrode according to claim 1, wherein the transition metal is selected from the group consisting of Ni, Pd, Co, Cu, and Fe.

6. The electrode according to claim 1, wherein the conductive substrate is made of carbon fiber and has a complex relief surface.

7. The electrode according to claim 1, wherein the conductive substrate is made of carbon and has a metal coating.

8. The electrode according to claim 1, wherein the conductive substrate is made of metal and has a complex relief surface.

9. The electrode according to claim 1, wherein the conductive substrate is made of a polymer with electronic conduction made as a film, porous structure or foam.

10. An electrochemical capacitor comprising a case housing a positive electrode and a negative electrode disposed inside the case, and an electrolyte filling the space between the electrodes, wherein the positive electrode comprises an electrically conductive substrate, a layer of energy accumulating redox polymer deposited onto the substrate, the redox polymer comprising a polymer metal complex with a substituted tetra-dentate Schiff's base selected from the group: poly-[Me(R, R'-Schiff-Y)], wherein Me is a transition metal;
Y is a bridge group binding the atoms of Nitrogen in the Schiff base;
R is an electron-donating substituent comprising a functional group (X)O—, —COO(X), where (X) is an alkali metal selected from the group consisting of Li and Na;
R' is Hydrogen or Halogen; and wherein
the polymer metal complex has the following structure:

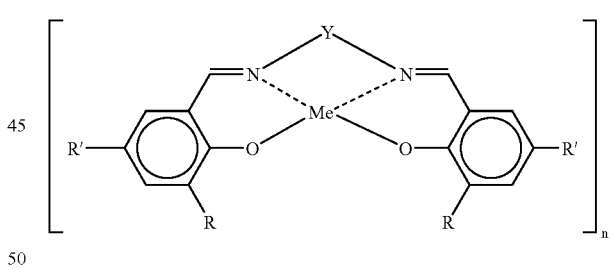

with n selected from the range from 2 to 50000.

11. The capacitor according to claim 10, wherein the negative electrode comprises an active material containing the same alkali metal contained in the composition of the electron-donating substituent of the redox polymer of the positive electrode.

12. The capacitor according to claim 10, wherein the electrolyte is a solution of a compound in an organic solvent, which compound is soluble in the solvent to a concentration of no less than 0.01 mol/l and which contains ions electrochemically inactive within the range of potentials from −3.0 to +1.5 V.

13. The capacitor according to claim 12, wherein the compound is a salt of the alkali metal contained in the electron-donating substituent of the energy-accumulating redox polymer of the positive electrode, the salt of the alkali metal selected from the group consisting of perchlorates, tetrafluoroborates, and hexafluorophosphates.

14. The capacitor according to claim 12, wherein the organic solvent is selected from the group consisting of acetonitrile, dimethyl ketone, and propylene carbonate.

15. The capacitor according to claim 10, wherein the electrolyte comprises a stabilizer.

16. The capacitor according to claim 10, wherein the electrolyte comprises a thickener for transitioning the electrolyte into a gel-like state.

17. The capacitor according to claim 10, further comprising a separator disposed between the electrodes and dividing an internal space of the capacitor into a cathode and an anode space.

18. The capacitor according to claim 10, wherein the case is made of a material resistant to the action of the electrolyte.

19. The capacitor according to claim 10, further comprising a device for pouring an electrolyte, a safety valve and a fastening element mounted on the case of the capacitor.

20. The capacitor according to claim 10, wherein the group Schiff-Y is Salen, which is a residue of bis(salicylaldehyde)-ethylenediamine.

21. The capacitor according to claim 10, wherein the group Schiff-Y is Saltmen, which is a residue of bis(salicylaldehyde)-tetramethylethylenediamine.

22. The capacitor according to claim 10, wherein the group Schiff-Y is Salphen, which is a residue of bis(salicylaldehyde)-o-phenylenediamine.

23. The capacitor according to claim 10, wherein the transition metal is selected from the group consisting of Ni, Pd, Co, Cu, and Fe.

24. The capacitor according to claim 10, wherein the conductive substrate is made of carbon fiber and has a complex relief surface.

25. The capacitor according to claim 10, wherein the conductive substrate is made of carbon and has a metal coating.

26. The capacitor according to claim 10, wherein the conductive substrate is made of metal and has a complex relief surface.

27. The capacitor according to claim 10, wherein the conductive substrate is made of a polymer with electronic conduction made as a film, porous structure or foam.

28. The capacitor according to claim 10, wherein the negative electrode comprises an electrically conductive substrate, a layer of energy accumulating redox polymer deposited onto the substrate, the redox polymer comprising a polymer metal complex with a substituted tetra-dentate Schiff's base selected from the group: poly-[Me(R, R'-Schiff-Y)], wherein Me is a transition metal;

Y is a bridge group binding the atoms of Nitrogen in the Schiff base;

R is an electron-donating substituent comprising a functional group (X)O—, —COO(X), where (X) is an alkali metal contained in the composition of the electron-donating substituent of the energy-accumulation redox polymer of the positive electrode;

R' is Hydrogen or Halogen; and wherein the polymer metal complex has the following structure:

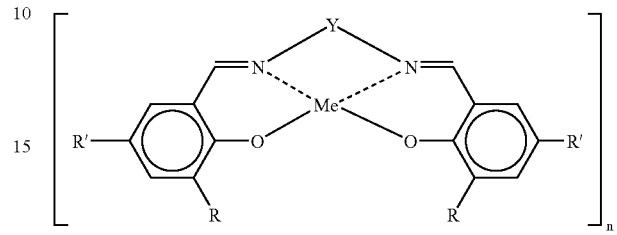

with n selected from the range from 2 to 50000.

29. The capacitor according to claim 28, wherein the group Schiff-Y of the said redox polymer of the negative electrode is Salen, which is a residue of bis(salicylaldehyde)-ethylenediamine.

30. The capacitor according to claim 28, wherein the group Schiff-Y of the said redox polymer of the negative electrode is Saltmen, which is a residue of bis(salicylaldehyde)-tetramethylethylenediamine.

31. The capacitor according to claim 28, wherein the group Schiff-Y of the said redox polymer of the negative electrode is Salphen, which is a residue of bis(salicylaldehyde)-phenylenediamine.

32. The capacitor according to claim 28, wherein the transition metal of the said redox polymer of the negative electrode is selected from the group consisting of Ni, Pd, Co, Cu, and Fe.

33. The capacitor according to claim 28, wherein the said conductive substrate of the negative electrode is made of carbon fiber and has a complex relief surface.

34. The capacitor according to claim 28, wherein the said conductive substrate of the negative electrode is made of carbon and has a metal coating.

35. The capacitor according to claim 28, wherein the said conductive substrate of the negative electrode is made of metal and has a complex relief surface.

36. The capacitor according to claim 28, wherein the said conductive substrate of the negative electrode is made of a polymer with electronic conduction made as a film, porous structure or foam.

* * * * *